United States Patent [19]

Shimizu

[11] Patent Number: 5,594,519
[45] Date of Patent: Jan. 14, 1997

[54] BLADE MECHANISM

[75] Inventor: Hitoshi Shimizu, Tokyo, Japan

[73] Assignee: Asahi Kogaku Kogyo Kabushiki Kaisha, Tokyo, Japan

[21] Appl. No.: 566,953

[22] Filed: Dec. 4, 1995

[30] Foreign Application Priority Data

Dec. 5, 1994 [JP] Japan ..................... 6-329983

[51] Int. Cl.⁶ ................. G03B 9/00; G03B 9/02
[52] U.S. Cl. ............. 396/449; 396/500; 396/510
[58] Field of Search ................... 354/228, 264, 354/265, 271.1, 274

[56] References Cited

U.S. PATENT DOCUMENTS 4,272,175  6/1981  Okura ...................... 354/274
4,335,947  6/1982  Lange ...................... 354/230
4,893,142  1/1990  Ishida et al. ............ 354/234.1
4,918,480  4/1990  Hori ....................... 354/400
5,040,017  8/1991  Arai ....................... 354/439
5,138,355  8/1992  Morisawa .................. 354/400
5,202,721  4/1993  Kobayashi et al. ......... 354/441
5,394,212  2/1995  Morizumi .................. 354/274

Primary Examiner—Safet Metjahic
Assistant Examiner—Eddie C. Lee
Attorney, Agent, or Firm—Greenblum & Bernstein, P.L.C.

[57] ABSTRACT

A blade mechanism includes a driving ring. At least two blades each have a pivot, a driving pin and an opening. The pivot of one blade is placed between the pivot and the driving pin of the other blade. The blades are rotated around the pivots by the driving ring. The opening is formed in the blades so as not to block the rotation of the other blades.

20 Claims, 4 Drawing Sheets

BLADE MECHANISM

BACKGROUND OF THE INVENTION

1. Field of the Invention

The present invention relates to a blade mechanism which has a plurality of blades to form an aperture.

2. Description of the Related Art

Conventionally, a blade mechanism provided in a camera has a plurality of blades which form an aperture. The blades have a driving pin and a pivot. The blades are rotated around the pivot by a driving mechanism which drives the driving pins. The size of the aperture is changed by the rotation of the blades.

However, the rotating position of the blades cannot be set accurately, because the range of movement of the blades is relatively large compared to the range of movement of the driving pin since the pivot and the driving pin are placed close to each other. Therefore, it is difficult to set the size of the aperture precisely.

On the other hand, there are some blade mechanisms in which the number of blades is increased in order to set the aperture more accurately. However, in such devices, the iris can not be closed completely, because the blades block each other.

SUMMARY OF THE INVENTION

Therefore, an object of the present invention is to provide a blade mechanism which controls a size of an aperture accurately, and which can be closed completely.

According to the present invention, there is provided a blade mechanism which includes a first blade rotatably provided around a first pivot, and has a first opening and a first driving point for rotating the first blade. A second blade is rotatably provided around a second pivot, and has a second opening and a second driving point for rotating the second blade. A driving ring rotates the first and second blades, respectively, by driving the first and second driving points. The first blade and the second blade are placed in such a manner that the first pivot is placed between the second pivot and the second driving point, and the second pivot is placed between the first pivot and the first driving point. The first and second blades form an aperture. The first opening does not block the rotation of the second blade. The second opening does not block the rotation of the first blade.

Further, according to the present invention, there is provided a blade mechanism which includes at least two blades, each of which has a pivot and a driving point. The blades are rotated around the pivot by driving the respective point. A driving ring drives the driving points to rotate each of the blades. The at least two blades form an aperture. Each pivot is positioned on a side opposite to the respective driving point, with the aperture therebetween.

BRIEF DESCRIPTION OF THE DRAWINGS

The present invention will be better understood from the description of the preferred embodiments of the invention set forth below, together with the accompanying drawings, in which:

FIG. 1 is an exploded perspective view which shows an iris device (i.e. a shutter device), provided in a camera, of an embodiment to which the present invention is applied;

DESCRIPTION OF THE PREFERRED EMBODIMENTS

Figure 2:
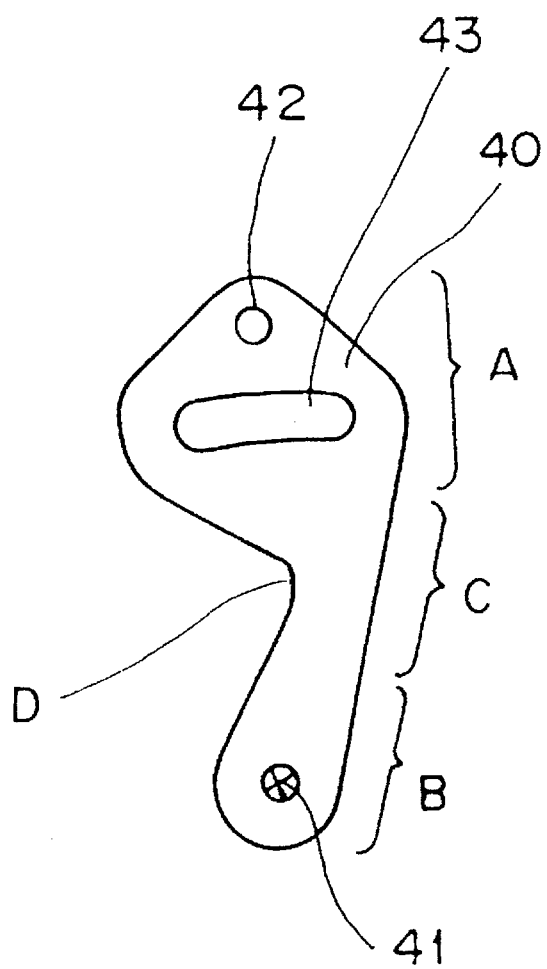
FIG. 2 is a plan view which shows the shape of the blades of the device of the embodiment.

The present invention will now be described with reference to embodiments shown in the drawings.

Figure 1:
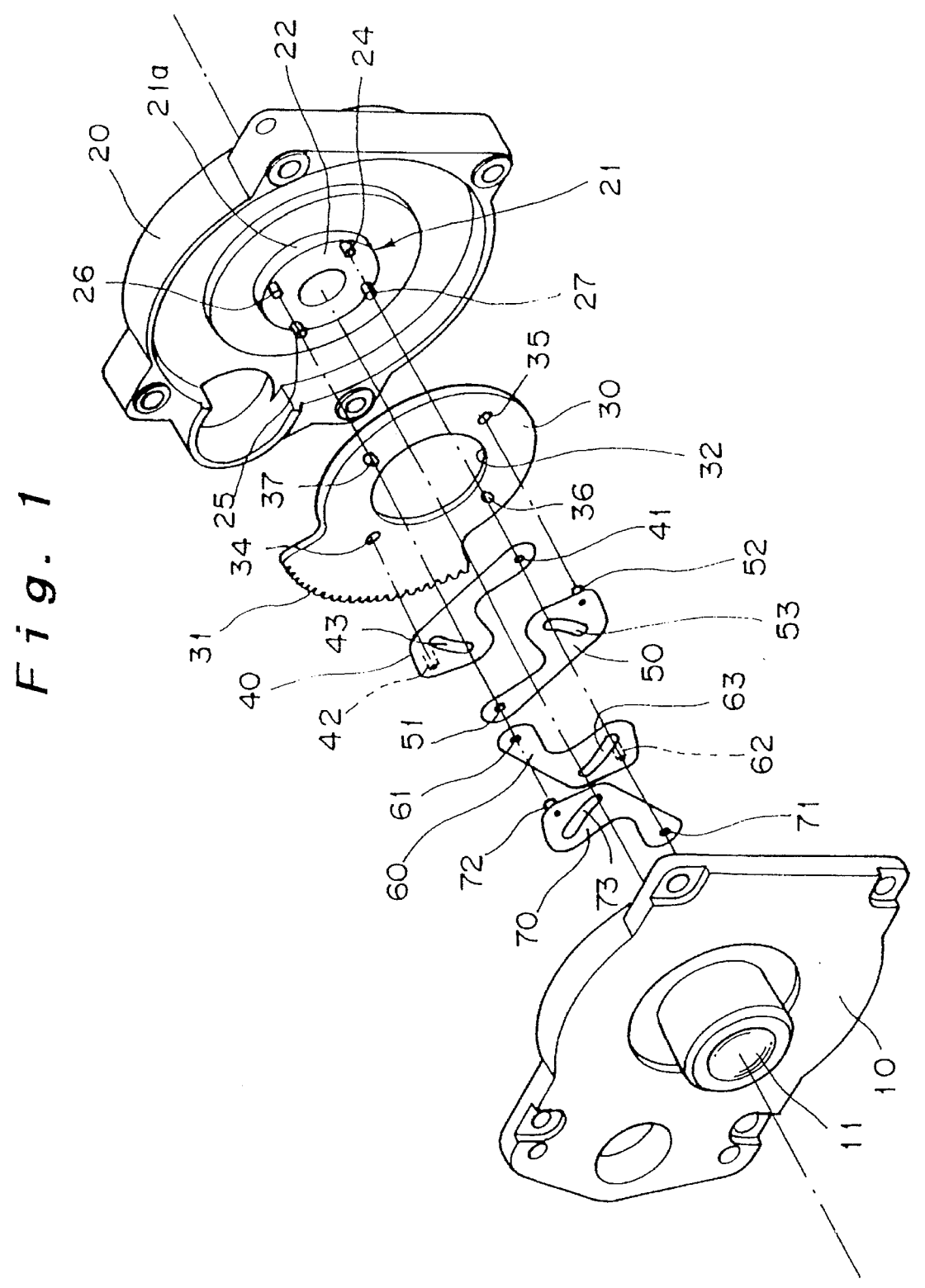

FIG. 1 is an exploded perspective view which shows the iris device (i.e. the shutter device), provided in a camera, according to the present invention.

A supporting frame 20 has a supporting portion 21. The shape of the supporting portion 21 is cylindrical-like. Namely, the supporting portion 21 has an outer circumferential surface 21a and a circular surface 22. The circular surface 22 is provided with four pivot pins 24, 25, 26, 27. The center of the circular surface 22 corresponds to an optical axis 1. The pivot pins are placed in a circular pattern with equal spacing, around the optical axis 1.

A driving ring 30 has a supporting hole 32 which fits rotatably to the outer circumferential surface of the supporting portion 21. The driving holes 34, 35, 36, 37 are provided in the driving ring 30 in a circular pattern with equal spacing, around the supporting hole 32. A sector gear 31 is formed at one part of the outer edge of the driving ring 30. A gear connected to an outer shaft of a motor (not shown in FIG. 1) meshes with the sector gear 31 to rotate the driving ring 30.

FIG. 2 shows the shape of a blade 40. The blade 40 has a driving portion A, a pivot portion B, and a connection portion C. The driving portion A is provided with a driving pin 42 and an opening 43. The supporting portion B is provided with a hole 41. A circular arc D provided in the connection portion C forms one part of the outer circumference of an aperture. The other blades 50, 60 and 70 have a similar shape and structure to the blade 40.

The pivot pin 24 is received in the hole 41 so that the blade 40 is rotated around the pivot pin 24. The driving pin 42 is inserted in the driving hole 34 of the driving ring 30. The opening 43 is provided in such a manner that the pivot pin 25 is movably inserted therein.

Similarly, the blade 50 is provided with a hole 51, a driving pin 52 and an opening 53. The pivot pin 25 is received in the hole 51 so that the blade 50 is rotated around the pivot pin 25. The driving pin 52 is inserted in the driving hole 35 of the driving ring 30. The opening 53 is provided in such a manner that the pivot pin 24 is movably inserted therein.

The distance between the hole 41 and the driving pin 42 is the same as the distance between the hole 51 and the driving pin 52. The pivot pin 24 is rotatably received in the hole 41 and the pivot pin 25 is rotatably received in the hole 51 are equidistant from each other with the center of the supporting portion 21 therebetween. The driving pin 42 and the driving pin 52 are equidistant from each other with the center of the supporting hole 32 therebetween. Accordingly, the blade 40 and the blade 50 are symmetrical with the optical axis 1 therebetween.

The blades 60 and 70 have the same structure as the blades 40 and 50. The pivot pin 26 is received in a hole 61 so that the blade 60 is rotated around the pivot pin 26. A driving pin 62 is inserted in the driving hole 36. An opening 63 is provided in such a manner that the pivot pin 27 is movably inserted therein. The pivot pin 27 is received in a hole 71 so that the blade 70 is rotated around the pivot pin 27. A driving hole 72 is inserted in the driving hole 37. An opening 73 is provided in such a manner that the pivot pin 26 is movably inserted therein.

The distance between the hole 61 and the driving pin 62 is the same as the distance between the hole 71 and the driving pin 72. The pivot pin 26 is rotatably received in the hole 61 and the pivot pin 27 is rotatably received in the hole 71, and are equidistant from each other with the center of the supporting portion 21 therebetween. The driving pin 62 and the driving pin 72 are equidistant from each other with the center of the supporting hole 32 therebetween. Accordingly, blades 60 and 70 are also symmetrical with the optical axis 1 therebetween.

A supporting frame 10, in which a photographing lens 11 is provided, is attached to the supporting frame 20 in such a manner that the supporting frame 10 covers the blades 40, 50, 60, 70 and the driving ring 30.

Figure 3:
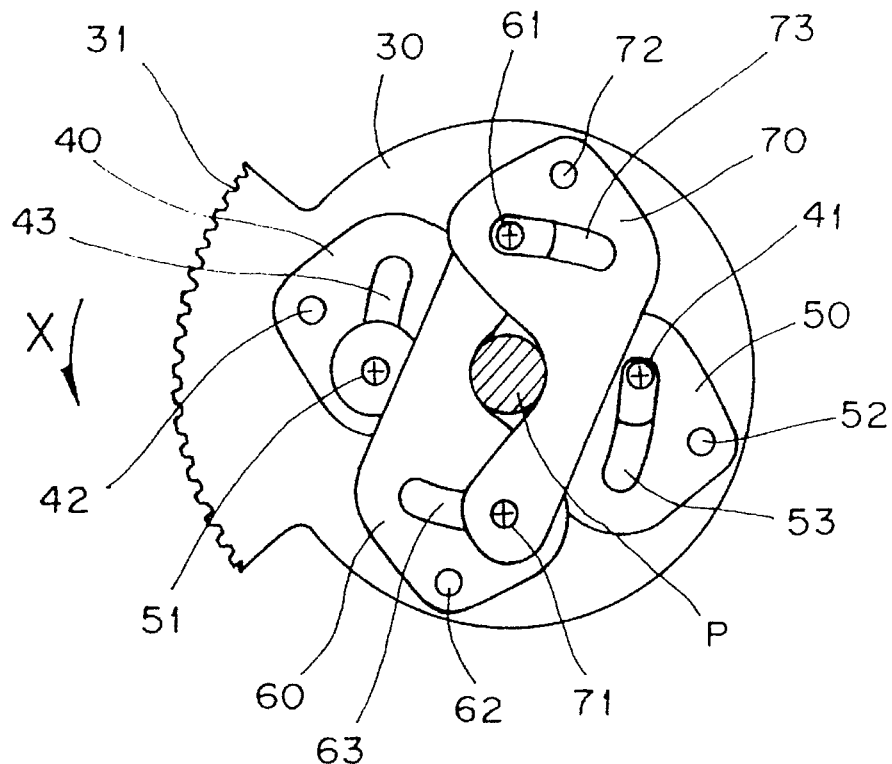
FIG. 3 is a plan view which shows the arrangement of the supporting ring and the blades when the size of the aperture has the maximum value.
Figure 4:
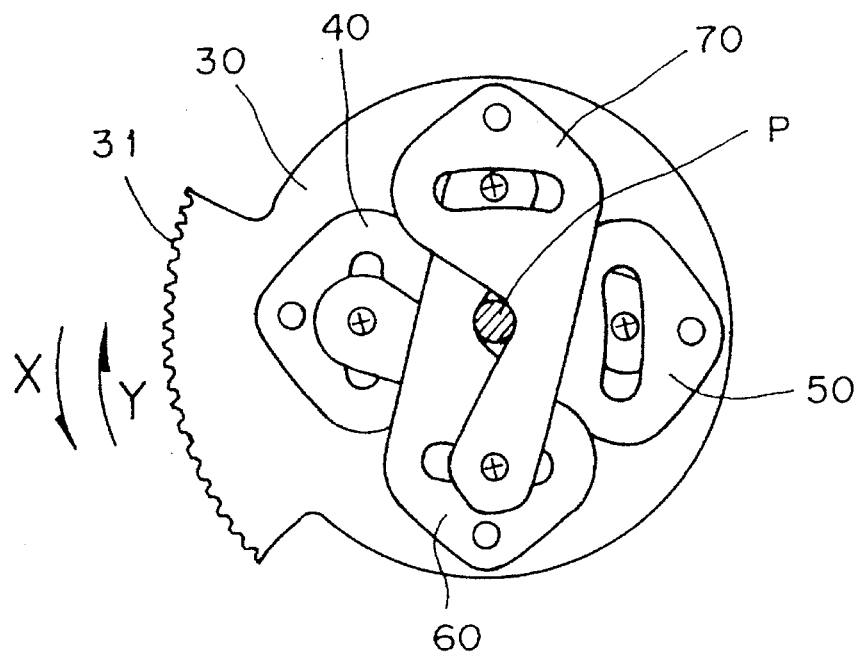
FIG. 4 is a plan view which shows the arrangement of the blades when the size of the aperture is smaller than that of the aperture shown in FIG. 3.
Figure 5:
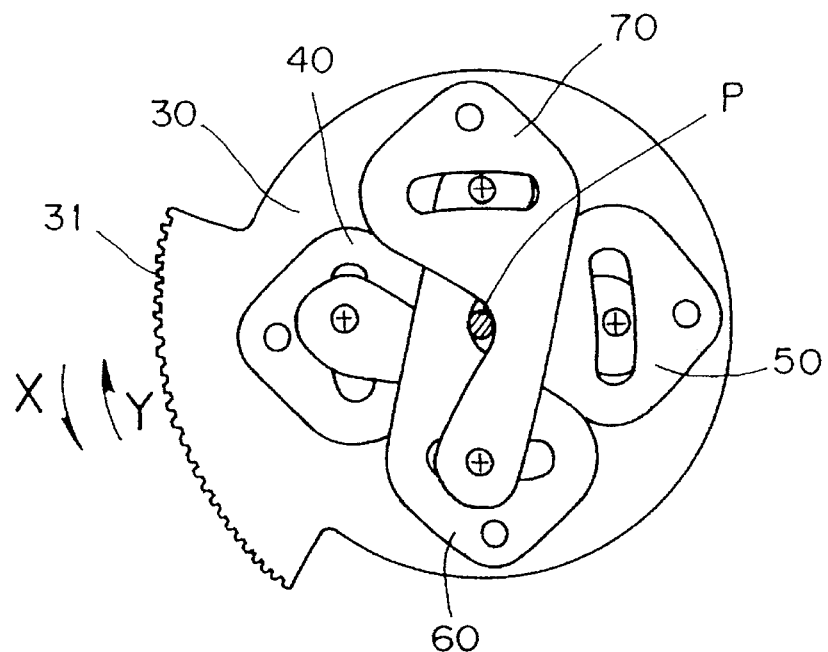
FIG. 5 is a plan view which shows the arrangement of the blades when the size of the iris is smaller than that of the aperture shown in FIG. 4.
Figure 6:
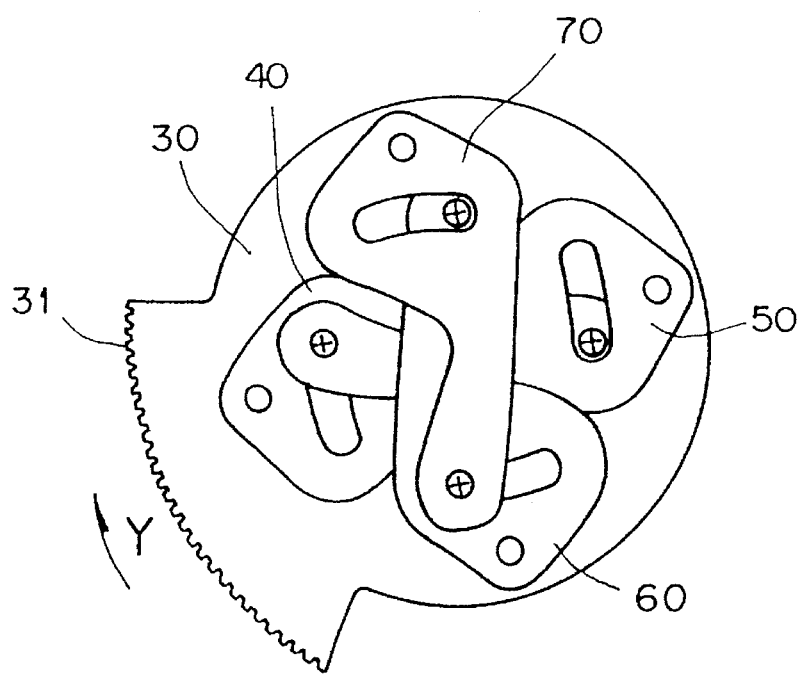
FIG. 6 is a plan view which shows the arrangement of the blades when the iris is completely closed.

FIG. 3 through FIG. 6 show the arrangement of the blades 40, 50, 60, 70 and the driving ring 30 viewed from the side of the supporting frame 10. FIG. 3 shows the iris, which is formed by the blades 40, 50, 60 and 70, opened fully, and the aperture P is a circle. FIG. 6 shows the iris closed completely. In these drawings, oblique lines indicate the aperture P.

The process in which the iris changes to a fully open status from a completely closed status is described below. In FIG. 3, a driving motor (not shown in FIG. 3) rotates the driving ring 30 in the direction X (counterclockwise) by the sector gear 31. Then, the blades 40, 50, 60, 70 are rotated in the direction X in accordance with the rotation of the driving ring 30, because the driving pins 42, 52, 62, 72 are inserted in the driving holes 34, 35, 36, 37 formed in the driving ring 30. The holes 41, 51, 61, 71 do not move, because the supporting portion 21, which is provided with the pins 24, 25, 26, 27 rotatably received in the holes, are fixed. Accordingly, the blades 40, 50, 60, 70 are rotated in the direction X around the holes 41, 51, 61, 71, respectively.

As described above, since the opening 43 is formed in such a manner that the pivot pin 25 is movably inserted therein, the blade 40 does not block the pivot pin 25. Similarly, since the opening 53 is also formed in such a manner that the pivot pin is movably inserted therein, the blade 50 does not block the pivot pin 24. Accordingly, the blades 40 and 50 do not block each other from rotating.

Similarly, since the opening 63 is formed in such a manner that the pivot pin 27 is movably inserted therein, the blade 60 does not block the pivot pin 27. Since the opening portion 73 is formed in such a manner that the pivot pin 26 is movably inserted therein, the blade 70 does not block the pivot pin 26. Accordingly, the blades 60 and 70 do not block each other from rotating.

After the driving ring 30 is rotated in the direction X by a predetermined amount, the aperture P formed by the four blades 40, 50, 60, 70 becomes smaller than in the fully open status, as shown in FIG. 4. In FIG. 4, the driving ring 30 is rotated in the direction X by a predetermined amount, and the aperture P becomes smaller than in FIG. 4, as shown in FIG. 5. Namely, in accordance with the rotation of the driving ring 30 in the direction X, the aperture P becomes smaller. Further, when the driving ring 30 is rotated in the direction X by a maximum amount, the iris is closed completely, as shown in FIG. 6.

In order to make the aperture larger, the driving ring 30 should be rotated in the direction Y.

As described above, in this embodiment, the driving pin 42 and the hole 41 to which the pivot pin 24 fits are separated from each other with the optical axis therebetween. The driving pin 52 and the hole 51 to which the pivot pin 25 fits, the driving pin 62 and the hole 61 to which the pivot pin 26 fits, and the driving pin 72 and the hole 71 to which the pivot pin 27 fits each have the same spacial relation as the driving pin 42 and the hole 41.

In the blade mechanism according to the embodiment of the present invention, the distance between the driving pin and the pivot pin is longer than in the conventional device. In the embodiment of the present invention, the range of movement of the blades corresponding to a predetermined range that the driving pins movement is relatively small compared to the movement range of the blades corresponding to movement range that the driving pins are driven in the conventional mechanism. Accordingly, the aperture formed by the blades can be set more accurately than in the conventional mechanism.

Further, the blades of the blade mechanism according to the embodiment of the present invention are provided with an opening, so as not to block the pivot pin of other blades. Accordingly, the blade mechanism can be completely closed. In this embodiment, the opening formed in the blades is a circular arc. However, it is not necessary for the shape of the opening to be a circular arc, provided that the opening does not block the pivot pin of the other blade.

Furthermore, in this embodiment, the outer circumference of the aperture is a circle when the iris is fully opened. However, it is not necessary for the outer circumference of the aperture to be a circle.

In this embodiment, the blade mechanism is applied to an iris device or a shutter device of a camera. However, the blade mechanism according to the present invention can be also applied to an aperture device by which the amount of light passing through a photographing lens of a camera is controlled.

The present disclosure relates to subject matter contained in Japanese Patent Application No. P06-329983 (filed on Dec. 5, 1994) which is expressly incorporated herein, by reference, in its entirety.

I claim:

1. A blade mechanism comprising:

a first blade rotatably provided around a first pivot, said first blade having a first opening and a first driving point for rotating said first blade;

a second blade rotatably provided around a second pivot, said second blade having a second opening and a second driving point for rotating said second blade;

means for rotating said first and second blades, respectively, by driving said first and second driving points;

said first pivot being disposed between said second pivot and said second driving point, and said second pivot being disposed between said first pivot and said first driving point;

said first and second blades selectively forming an aperture therebetween;

said first opening being formed so as not to block rotation of said second blade; and said second opening being formed so as not to block rotation of said first blade.

2. A blade mechanism according to claim 1, wherein said rotating means comprises a driving ring having first and second holes in which said first and second driving points are inserted respectively.

3. A blade mechanism according to claim 1, wherein each of said first and second blades have a driving portion, a pivot portion and a connection portion, said driving portion having each of said first and second driving points and each of said first and second openings, said pivot portion having each of said first and second pivots, and said connection portion having a circular arc.

4. A blade mechanism according to claim 3, wherein said circular arc of each of said first and second blades forms at least a portion of an outer circumference of said aperture.

5. A blade mechanism according to claim 4, wherein said aperture is substantially circular.

6. A blade mechanism according to claim 1, wherein said first and second blades are provided in a shutter device of a camera, by which the amount of light passing through a photographing lens of said camera is controlled.

7. A blade mechanism according to claim 1, wherein said first and second blades are provided in an aperture device of a camera, by which the amount of light passing through a photographing lens of said camera is controlled.

8. A blade mechanism comprising:
at least two blades, each having a pivot, a slot, and a driving point, each of said at least two blades being rotated about said pivot by movement of said driving point;
said pivot of one of said at least two blades extending through said slot of another of said at least two blades to define a range of movement of said another of said at least two blades;
means for driving said driving points to rotate each of said at least two blades;
said at least two blades selectively forming an aperture therebetween; and
said pivot of each of said at least two blades being positioned on a side opposite to said driving point of each of said at least two blades with said aperture therebetween.

9. A blade mechanism according to claim 8, wherein said driving means comprises a driving ring having driving holes in which said driving point of each of said at least two blades is inserted, respectively.

10. A blade mechanism according to claim 8, further comprising a supporting frame, said supporting frame having a plurality of supporting pins which rotatably support said pivot of said at least two blades.

11. A blade mechanism according to claim 10, wherein said slot is formed in said one of said at least two blades such that said one of said at least one supporting pins which supports said pivot of said another of said at least two blades is movably inserted in said slot.

12. A blade mechanism according to claim 8, wherein said at least two blades are provided in a shutter device of a camera, by which the amount of light passing through a photographing lens of said camera is controlled.

13. A blade mechanism according to claim 8, wherein said at least two blades are provided in an aperture device of a camera, by which the amount of light passing through a photographing lens of said camera is controlled.

14. A blade mechanism comprising:
at least first and second blades;
said first blade having a first pivot, a first opening, and a first driving point, said first blade being rotated about said first pivot by movement of said first driving point;
said second blade having a second pivot, a second opening, and a second driving point, said second blade being rotated about said second pivot by movement of said second driving point;
said first pivot extending through said second opening, and said second pivot extending through said first opening;
means for driving said first and second driving points to rotate said first blade about said first pivot point and to rotate said second blade about said second pivot point; and
said first and second blades selectively forming an aperture therebetween.

15. The blade mechanism according to claim 14, said first pivot being positioned on a side opposite of said first driving point, and said second pivot being positioned on a side opposite said second driving point, with said aperture therebetween.

16. The blade mechanism of claim 15,
said first blade comprising a first driving portion having said first driving point and said first opening, a first pivot portion comprising said first pivot, and a first connecting portion having a circular arc; and
said second blade has a second driving portion comprising said second driving point and said second opening, a second pivot portion comprising said second pivot, and a second connecting portion having a circular arc.

17. The blade mechanism of claim 16, wherein said circular arc of said first and second blades forms at least a portion of said aperture.

18. The blade mechanism of claim 17, wherein said aperture is substantially circular.

19. The blade mechanism according to claim 14, wherein said first and second blades are provided in a shutter device of a camera, by which an amount of light passing through a photographing lens of said camera is controlled.

20. The blade mechanism according to claim 14, wherein said first and second blades are provided in an aperture device of a camera, by which an amount of light passing through a photographing lens of said camera is controlled.

* * * * *